US008858687B2

(12) United States Patent  (10) Patent No.: US 8,858,687 B2
Jackson  (45) Date of Patent: Oct. 14, 2014

(54) FILTER ASSEMBLY WITH DYNAMIC FILTER MEDIA

(71) Applicant: Roll Filter LLC, Zebulon, NC (US)

(72) Inventor: David E. Jackson, Wake Forest, NC (US)

(73) Assignee: Roll Filter LLC, Zebulon, NC (US)

( * ) Notice: Subject to any disclaimer, the term of this patent is extended or adjusted under 35 U.S.C. 154(b) by 139 days.

(21) Appl. No.: 13/628,334

(22) Filed: Sep. 27, 2012

(65) Prior Publication Data

US 2014/0083295 A1    Mar. 27, 2014

(51) Int. Cl.
*B01D 46/00* (2006.01)
(52) U.S. Cl.
USPC .............. 95/277; 95/287; 55/351; 55/352; 55/354; 55/482
(58) Field of Classification Search
CPC ........ B01D 46/18; B01D 46/20; B01D 46/00; B01D 46/22; F24F 13/28
USPC ............ 55/351, 352, 354, 422, 506; 95/1, 19, 95/26, 277; 96/421, 423, 429
See application file for complete search history.

(56) References Cited

U.S. PATENT DOCUMENTS

| | | |
|---|---|---|
| 3,572,016 A | 3/1971 | Neumann |
| 4,054,521 A | 10/1977 | Winzen |
| 4,174,205 A | 11/1979 | Koushiafes |
| 4,221,576 A | 9/1980 | Phillips |
| 4,470,833 A | 9/1984 | Wolfe |
| 4,627,863 A | 12/1986 | Klein |
| 4,826,596 A | 5/1989 | Hirs |
| 4,925,560 A | 5/1990 | Sorrick |
| 6,152,998 A | 11/2000 | Taylor |
| 6,168,646 B1 | 1/2001 | Craig |
| 6,402,822 B1 | 6/2002 | Najm |
| 6,596,059 B1 | 7/2003 | Greist |
| 6,632,269 B1 | 10/2003 | Najm |
| 6,843,834 B2 * | 1/2005 | Schumacher .................. 95/277 |

(Continued)

FOREIGN PATENT DOCUMENTS

| | | |
|---|---|---|
| EP | 2154441 A | 2/2010 |
| KR | 20-1992-005282 Y1 | 7/1992 |
| KR | 10-2003-0075565 A | 9/2003 |
| KR | 10-2005-0103362 A | 10/2005 |

OTHER PUBLICATIONS

International Search Report and Written Opinion of the International Searching Authority for related application PCT/US2013/056203, Oct. 28, 2013, by Korean Intellectual Property Office, 12 pages.

*Primary Examiner* — Duane Smith
*Assistant Examiner* — Minh-Chau Pham
(74) *Attorney, Agent, or Firm* — Kevin E Flynn; Flynn IP Law

(57) ABSTRACT

A filter assembly for removing particles from air flow across the filter assembly with a frame around a perimeter of the filter assembly, dynamic filter media for removing particles from air flowing from an upstream side of the filter assembly to a downstream side of the filter assembly that passes from a clean filter media storage chamber to a used filter media collection chamber within the frame on a second side of the filter assembly. The dynamic filter media is moved from the output from a turbine shaft modified by a gearbox to drive a set of drive traction rollers.

21 Claims, 8 Drawing Sheets

(56) References Cited

U.S. PATENT DOCUMENTS

| | | |
|---|---|---|
| 7,608,121 B2 * | 10/2009 | Boyer et al. .................. 55/282.2 |
| 7,785,382 B2 * | 8/2010 | Morton ........................... 55/332 |
| 7,794,529 B2 * | 9/2010 | Lo ................................... 96/420 |
| 8,182,588 B2 * | 5/2012 | Morton ........................... 95/273 |
| 8,404,030 B2 * | 3/2013 | Schumacher ................... 95/277 |
| 2012/0055339 A1 * | 3/2012 | Schumacher ................... 95/277 |
| 2012/0187586 A1 | 7/2012 | Tsuda |

* cited by examiner

FILTER ASSEMBLY WITH DYNAMIC FILTER MEDIA

This application incorporates by reference a set of United States applications, provisional applications, and issued patents including: U.S. Pat. No. 6,843,834 for Self-Renewing Air Filter and U.S. Published Patent Application No. US 2012/0044339 for Gearbox and Self-Renewing Air Filter.

While these applications have been incorporated by reference to provide additional detail it should be noted that these other applications (including those that have subsequently issued as patents) were written at an earlier time and had a different focus from the present application. Thus, to the extent that the teachings or use of terminology differ in any of these incorporated applications from the present application, the present application controls.

BACKGROUND

1. Field of the Disclosure

This disclosure relates to air filters and more generally to filtering devices for fluids. The disclosure addresses a filter assembly that has filter media that moves relative to the filter assembly.

2. Background

One application of a filter assembly that employs teachings from the present disclosure is in a filter assembly intended for placing in a return air duct for a heating, ventilation, and air conditioning system (HVAC system) or any air handling system that performs a subset of those functions. Filters are intended to be replaced or at least removed and cleaned from time to time in order to prevent accumulated particles on the upstream side of the filter from severely restricting the flow of air through the system or requiring unusual amount of energy to be provided to fans to provide a requisite amount of air flow. Restricting the airflow through the system may cause the air conditioning compressor to have to work longer in order to cool a building as the reduced air flow across the cooling coils causes the system to work slower than designed. Extending the compressor operating time increases the energy consumed in the cooling operation.

Frequently the duct has a flange near a grilled opening to the system. The duct flange extends outward to allow the perimeter of an air filter to rest against the duct flange on the upstream side so that the flow of air tends to push the air filter towards that duct flange rather than away from the duct flange. Thus, a prior art air filter was typically filter material surrounded by a frame that substantially filled the non-flanged portion of the duct and the downstream face of the frame fit against the upstream side of the duct flange. Frequently there is a standard depth for air filters so that the air filter fits entirely between two planes defined by the front of the duct and the duct flange.

SUMMARY OF THE DISCLOSURE

The present disclosure teaches the creation and use of a filter assembly for removing particles from a fluid flow such as air, gases other than air, or liquids. The filter assembly has at least one level of filtration provided by dynamic filter media. As used in this application dynamic filter media is filter media that moves relative to the filter assembly frame so that clean filter media is presented to the airstream over time and used filter media is moved out of the airstream. Thus, dynamic filter media is in contrast to static filter media that does not move relative to the filter assembly.

The present disclosure teaches a quantity of dynamic filter media for removing particles from fluid flowing from an upstream side of the filter assembly to a downstream side of the filter assembly. The dynamic filter media moving from a clean filter storage chamber on a first side of the filter assembly to a used filter media collection chamber within the frame on a second side of the filter assembly, opposite from the first side. The movement that deposits dynamic filter media into the used filter media collection chamber is caused by a turbine which spins from fluid flow traveling from the upstream side of the filter assembly to the downstream side of the filter assembly. The torque input from the turbine shaft is converted by a gearbox to a higher torque lower speed output for use in a traction rollers drive which drives the dynamic filter media across the upstream side of the filter assembly and deposits the used dynamic filter media into the used filter media collection chamber.

The use of the turbine to drive the movement of the dynamic filter media allows fresh dynamic filter media to be presented to continue to remove larger particles from the fluid stream. The used dynamic filter media and the captured larger particles are driven into a used filter media collection chamber. The use of dynamic filter media allows an extended life for the filter assembly while maintaining pressure drops across the filter assemblies that are acceptable.

In some instances, one or more layers of static filters may be located in the filter assembly downstream of the dynamic filter.

Additional aspects of the teachings contained within this disclosure are addressed in the claims submitted with this application upon filing. Rather than adding redundant restatements of the contents of the claims, these claims should be considered incorporated by reference into this summary.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provide below as one of skill in the art will recognize that inventive concepts illustrated in various examples can be combined together in order to address a specific application.

Other systems, methods, features and advantages of the disclosed teachings will be or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

This disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
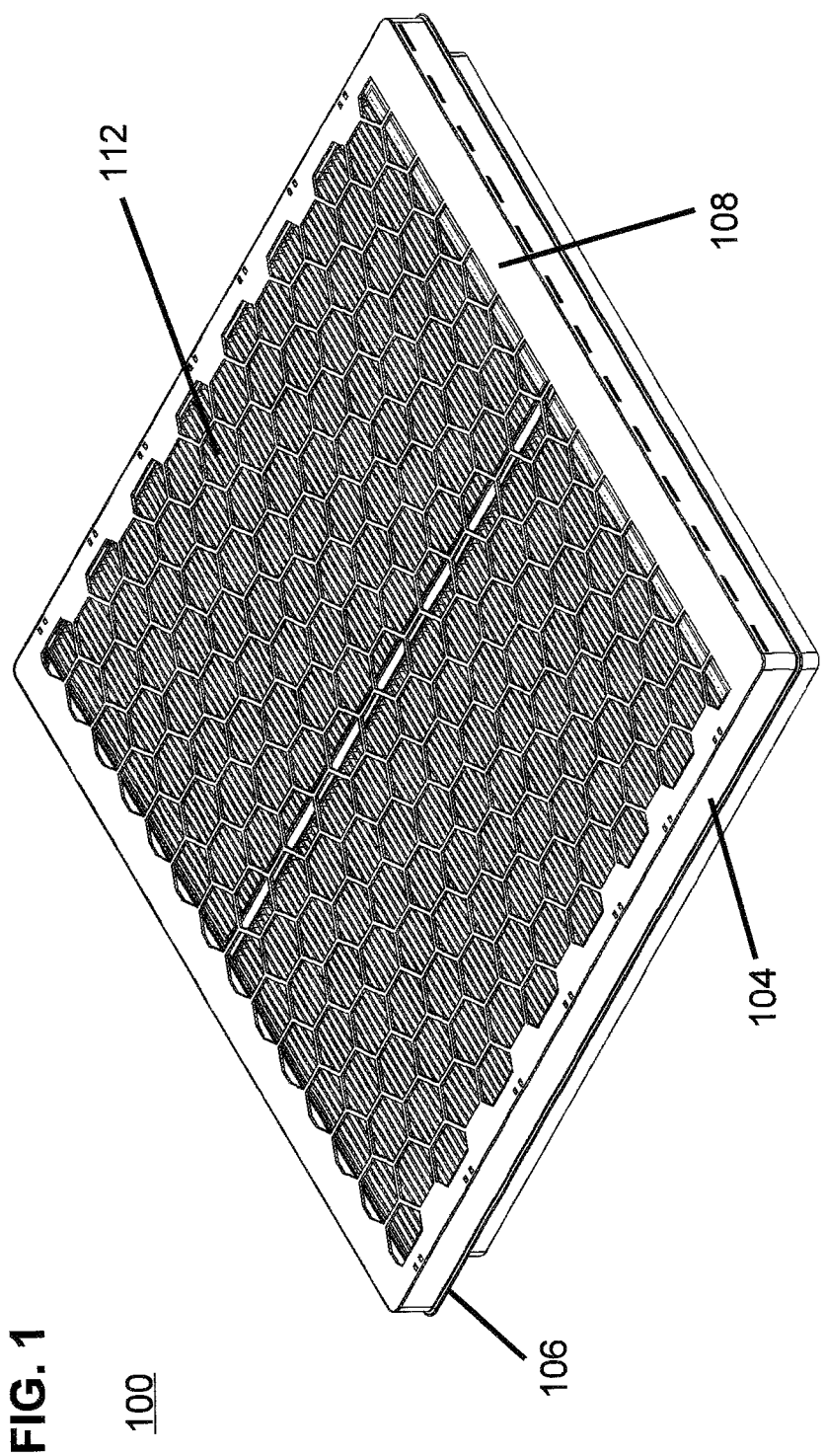
FIG. 1 shows an isometric view of a filter assembly.

FIG. 1 shows an isometric view of a filter assembly 100. Visible in this view are frame 104 with upstream cover 108 as the filter assembly 100 has an upstream end and a downstream end. Visible through upstream cover 108 is dynamic filter media 112. While the upstream cover 108 could have a variety of configurations, a honeycomb grill design may be useful in decreasing airflow turbulence. FIG. 1 shows perimeter seal 106 which may be an elastomeric seal that surrounds the intermediate surface of the filter assembly 100 to reduce leakage of air around a duct filter by sealing the filter assembly/duct interface. Some estimates are that twenty percent of airflow bypasses a traditional air filter by going around the perimeter of the filter. Air that bypasses the filter is not filtered. The problem with air bypass is exacerbated when an air filter becomes clogged with large particles on the upstream face of the filter.

The perimeter seal 106 may be designed such that it extends over the edges on all sides such that it will form a seal on both the sides and the back of the filter assembly 100. In many instanced closing the grill (not shown) that covers the filter assembly 100 at the entrance of the duct will compress the perimeter seal 106. In other instances as the gap between the grill and the duct frame 400 (discussed below) is too large, the force of the air during operation of the system will push the filter frame against the duct flange 420 (discussed below). The portion of the perimeter seal 106 on the outside edge of the filter assembly 100 will be compressed against the sides to the extent of the fit. In other words, the dimensions of the fixture open vary somewhat so the perimeter seal 106 may or may not form a seal on the sides. However, even an imperfect seal will still substantially reduce the amount of air the bypasses the filter media. By minimizing the amount of air that bypasses the filter media, less unfiltered air is supplied back via the vents to the rooms or other work spaces.

Figure 2:
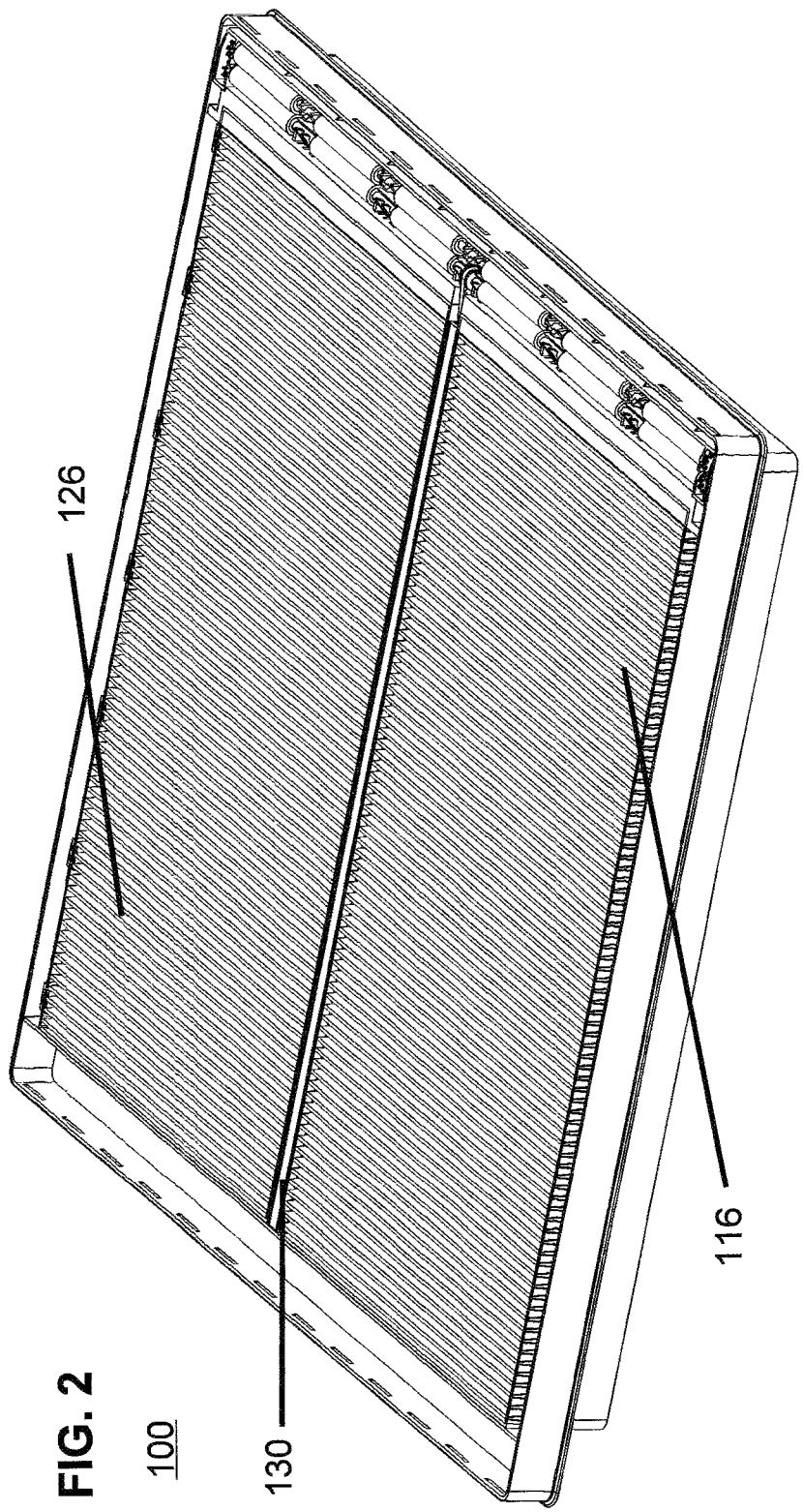
FIG. 2 shows the view from FIG. 1 with the upstream cover and dynamic filter media rendered invisible.

Secondly, unfiltered air carries particles that will coat and thus insulate the coils in the air handling system. Coils insulated with dust are less effective in cooling the air. Being less effective at cooling the air means that system must run more and thus drives up energy costs. FIG. 2 shows the view from FIG. 1 with the upstream cover 108 and dynamic filter media rendered invisible. In FIG. 2 visible are a pair of static filter inserts (116 and 126) are on either side of the frame crossbar 130. These static filter inserts (116 and 126) may use pleated filter material to increase the surface area of the static filter.

Figure 3:
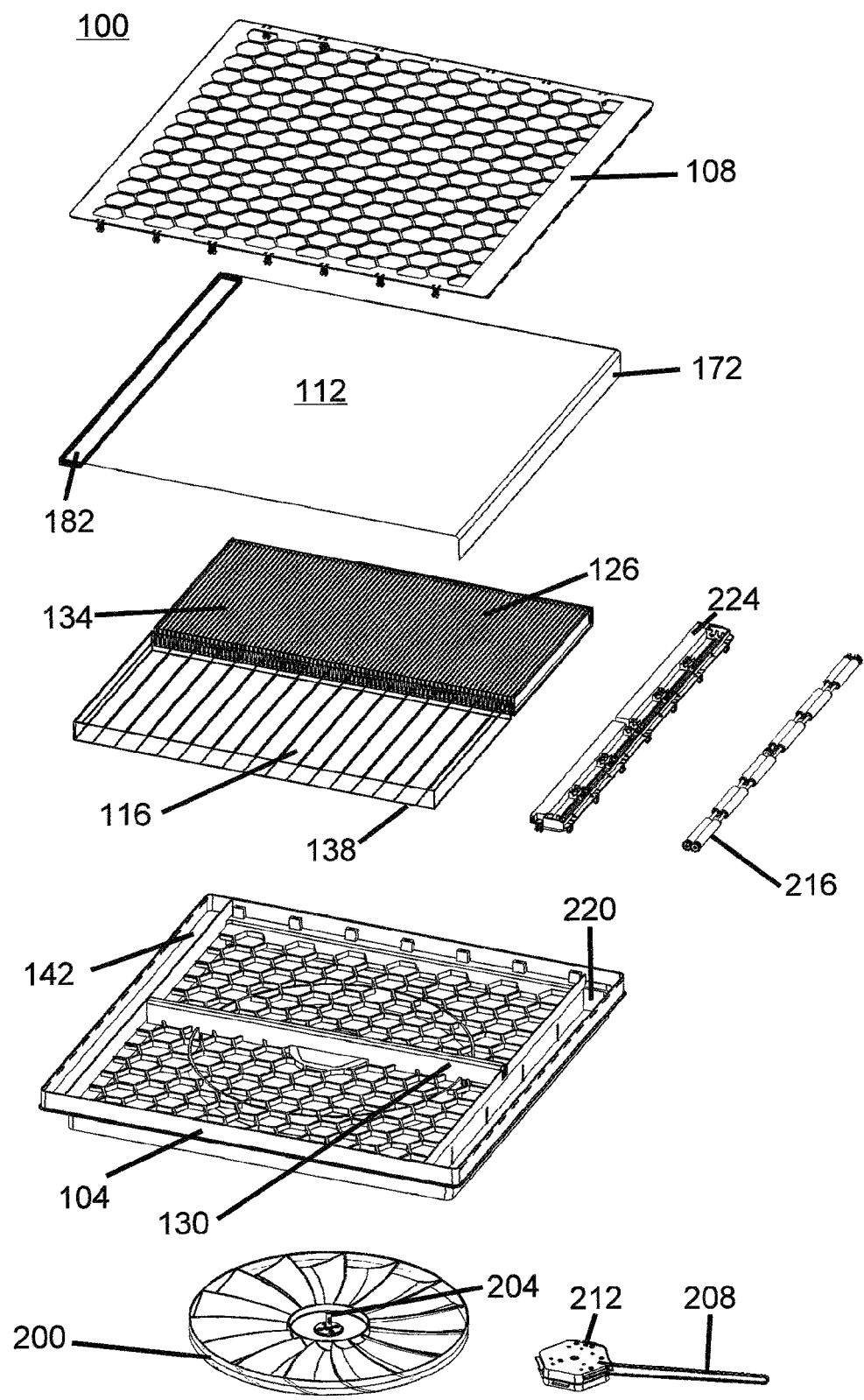
FIG. 3 is an exploded diagram of the filter assembly.

FIG. 3 is an exploded diagram of the filter assembly 100. FIG. 3 does not include various screws and a retaining ring for the turbine shaft that would be routine parts for one of skill in the art. FIG. 3 shows the upstream cover which may be adapted for a snap fit with frame 104. The dynamic filter media 112 is shown with a stub to represent used dynamic filter media 172. At the other side of the dynamic filter media 112, dark lines show the fan-fold edges of a short stack 182 of clean unused dynamic filter media 112 that is in the clean filter media chamber 142. The short stack 182 is oriented with the folds on the inside and outside edges of the clean filter media chamber 142 although the folds could be oriented towards the upstream and downstream sides of the clean filter media chamber 142. The actual stack of clean dynamic filter media 112 initially stored in the clean media storage chamber 142 is likely to be several times the quantity represented by short stack 182.

The amount of dynamic filter media 112 stored in the clean media storage chamber 142 may be adequate for a year of operation of the filter assembly 100 as the rate of movement of dynamic filter media across the filter assembly is on the order of 0.02 inches of movement per hour of operation of the HVAC system at an air speed of 400 feet per minute. For applications with less of a need for filtration, the rate of movement may be designed to be less, such as 0.01 inches of movement per hour of operation of the HVAC system at an air speed of 400 feet per minute. For applications with greater needs for filtration such as in an environment that can be expected to have a higher concentration of large particles to be removed, the rate of movement of the dynamic filter may be significantly higher such as 0.1 inches of movement per hour of operation of the HVAC system at an air speed of 400 feet per minute.

One of skill in the art will recognize that to the extent that static filters are present in a filter assembly, that the air speed across the filter assembly may decrease over the life of the filter as the static filter media becomes partially clogged with particles. As the air speed across the filter assembly drops slightly, the rate of movement of the dynamic filter material 112 will drop slightly as the turbine (described below) rotates slightly less frequently. One of skill in the art will recognize that there will be some variability of the speed of air traversing the air filter at various locations on the air filter.

The static filters inserts 116 and 126 in the filter assembly 100 may last for a year under intended operating conditions as the filter assembly 100 continues to clear the most if not all the larger particles from the filter assembly 100 through the use of dynamic filter media 112. Changing out the dynamic filter media 112 with the trapped large particles, keeps the overall pressure drop of the filter assembly 100 closer to desired levels whereas conventional filters become clogged on the upstream face with large particles. For some airflow applications, the concept "large particles" may mean an intent to remove the majority of particles with a dimension in excess of one micron. For some other airflow applications, the concept "large particles" may mean an intent to remove the majority of particles with a dimension in excess of ten microns. One of skill in the art will recognize that filter technology is not a binary go/no go test. A filter seeking to remove particles of a certain size may not remove 100.00% of the particles of that target size. Conversely, the filter will remove a progressively smaller percentage of smaller particles as underage with respect to the target particle size increases.

Below the dynamic filter media 112 is the pair of static media filters 116 and 126 with the static filter media 134 removed from static filter insert 116 to reveal the static filter frame 138 which helps give the static filter insert a definite shape. Adjacent the static media filters are the used media filter cover 224 and the drive traction rollers 216. The used media filter cover 224 may be adapted to have a snap-fit into the frame 104.

Below the dynamic filter media 112 is the frame 104 with frame cross bar 130, clean filter media chamber 142, and used filter media chamber 220. The two chambers are enclosed with the addition of upstream cover 108.

Below the frame 104 is turbine 200 with turbine shaft 204. Adjacent the turbine 200 is gearbox 212 and drive belt 208. In an assembled filter assembly 100, the gearbox 212 may be placed between the turbine 200 and the frame 104.

Figure 4:
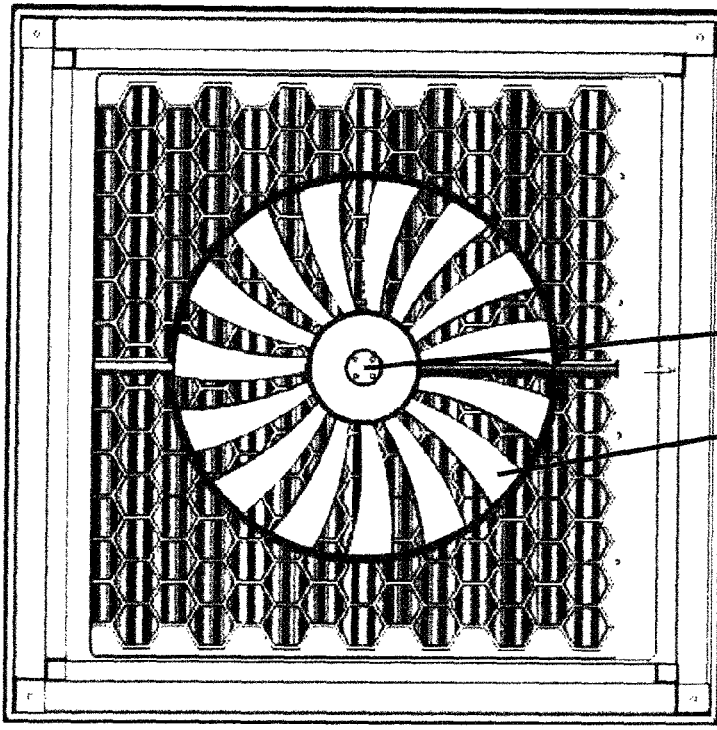
FIG. 4 shows a view of filter assembly from the downstream side for a filter assembly placed in a duct frame.

FIG. 4 shows a view of filter assembly 100 from the downstream side for a filter assembly placed in a duct frame 400. Visible in this drawing is turbine 200 with turbine shaft 204 in the rotational centerline of the turbine 200.

Figure 5:
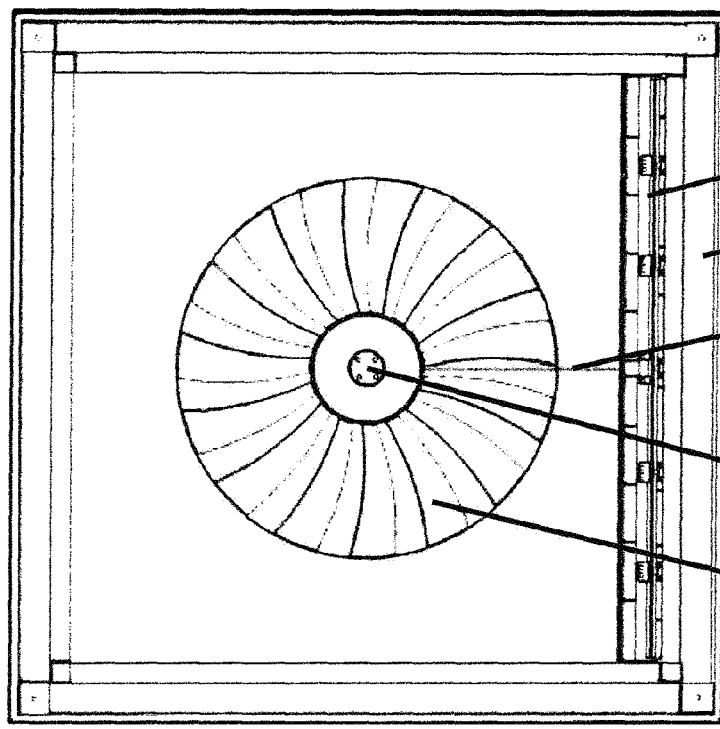
FIG. 5 is the view from FIG. 4 with additional components made invisible to reveal internal details.

FIG. 5 is the same view as FIG. 4 but has additional components made invisible so that one can see that a drive belt 208 connects the output of a gearbox 212 located on the upstream side of the turbine 200 to a set of drive traction rollers 216 adjacent a used filter media collection chamber 220.

Fluid flow through the filter assembly 100 causes rotation of the turbine 200. The rotating turbine shaft 204 is connected to the gearbox 212 (not visible here) which rotates the drive belt 208 that drives the drive traction rollers 216 to move the dynamic filter material 112 (FIG. 1) from the clean filter media storage chamber (discussed below) across the upstream face of the filter assembly and into the used filter media collection chamber 220. The drive traction rollers 216 may be made of an elastomeric material.

One of skill in the art will recognize that the pumps or fans causing movement of the fluid from the upstream to downstream side of the filter assembly will provide energy captured by the turbine for use in moving the dynamic filter material. Thus, when the system is not active (such as when a HVAC system is not circulating air), the turbine will not be moving. As the turbine is not moving, the dynamic filter media 112 is not moving. Thus, dynamic filter media 112 is not discarded to the used filter media collection chamber 220 unless the dynamic filter media 112 has been used for capturing large particles from air flow crossing from the upstream to downstream sides of the filter assembly 100.

The teachings of the present disclosure encourage the use of a drive system configured so that the faster the turbine 200 spins (from larger amounts of fluid flow through the filter assembly) the faster the drive traction rollers 216 move. The faster the drive traction rollers 216 move, the faster the dynamic filter media 112 is moved into the used filter media collection chamber 220. The speed that dynamic filter media 112 is moved into the used filter media collection chamber 220 is dependent on the rate of air flow and largely independent of the length of time that the filter assembly 100 has been in service. In other words, the rate is largely unchanged whether the filter assembly 100 has just recently been placed in service or has been in service for an extended period of time. This substantial independence is distinct from the result that one obtains using a take up roller that is driven—as the diameter of the take-up roller plus previously gathered used dynamic media will change over time.

One of skill in the art will recognize that over time as the filter assembly 100 is subject to many hours of operation that the static filter media 134 will become partially obstructed and thus the air flow across filter assembly 100 will decrease so that the turbine 200 moves slightly slower and the dynamic filter media 112 travels slightly slower. Likewise, as the turbine 200 picks up a thin layer of dust, the turbine 200 may rotate slightly less fast from a particular flow of air past the turbine 200. So the speed that dynamic filter media 112 is moved into the used filter media collection chamber 220 is not totally independent of whether the filter assembly 100 has just recently been placed in service or has been in service for an extended period of time, but it is much less dependent than a unit that uses a take-up roll with a changing diameter.

Conversely, if a filter assembly 100 was tested using air without particles, ("particle free air") the rate of movement of the dynamic filter media 112 would remain proportional to the rate of fluid flow from the upstream side to the downstream side across the filter assembly as the turbine would not become fouled over time with particles.

Figure 6:
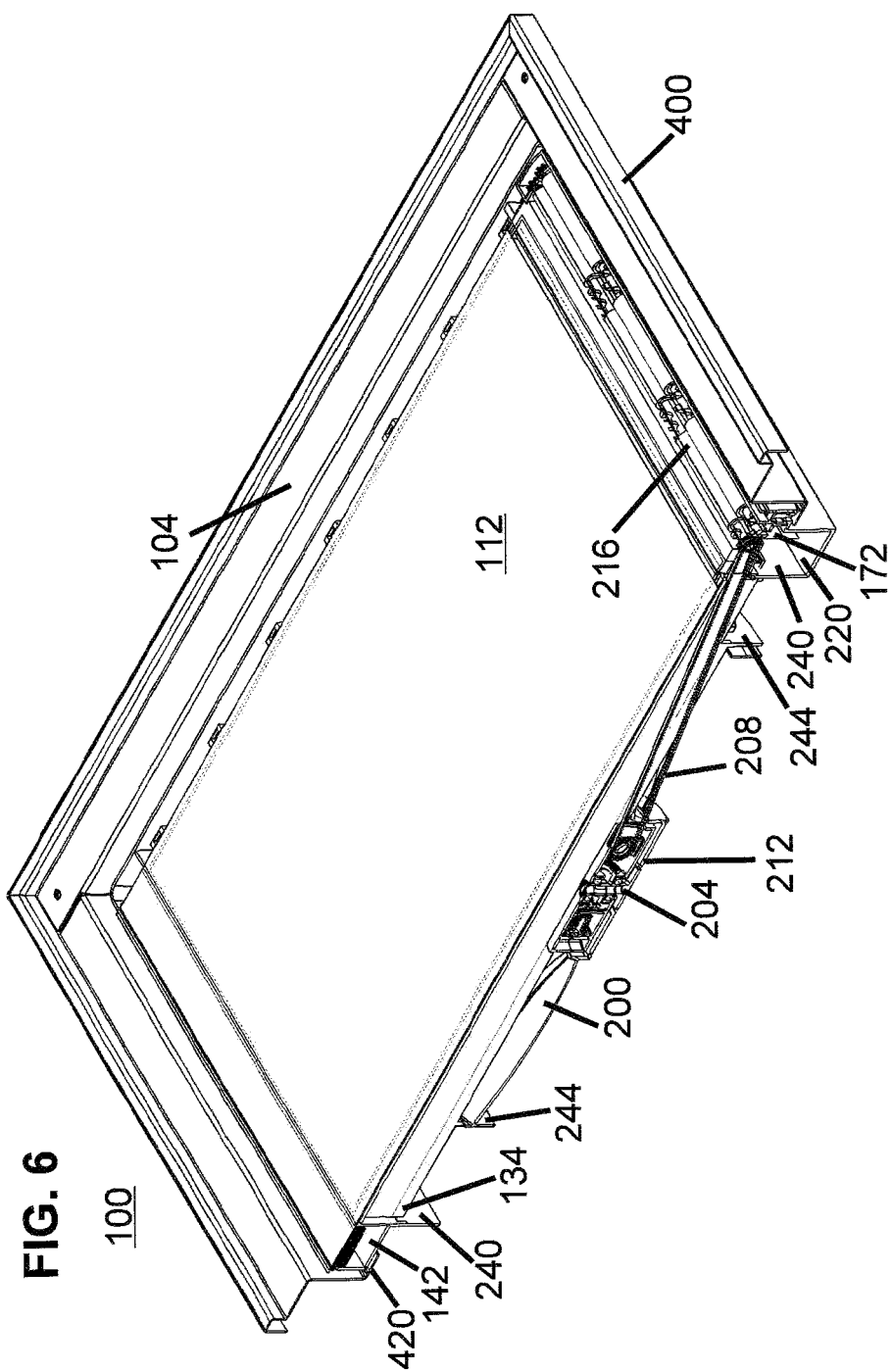
FIG. 6 is a cross section of the filter assembly in a duct frame with the upstream cover removed and taken through the frame cross bar and the centerline of the turbine shaft.

FIG. 6 is a cross section of the filter assembly 100 in a duct frame 400 with the upstream cover 108 (FIG. 1) removed and taken through the frame cross bar 130 (FIG. 2) and the centerline of the turbine shaft 204 (FIG. 4). The gearbox 212 is adjacent the downstream side of the frame 104. Further downstream is the turbine 200 which is connected to the gearbox 212 through the turbine shaft 204. The gearbox 212 converts the high speed/low torque output of the turbine shaft 204 to a low speed/high torque output that is used to move drive belt 208 to rotate drive traction rollers 216 to push used dynamic filter media 172 into the used filter media chamber 220.

As dynamic filter media 112 is pulled across the upstream face of the filter assembly 100, new dynamic filter media is pulled from the clean filter media storage chamber 142. The dynamic filter media 112 may be stored in the clean filter media storage chamber 142 in a variety of dispensable forms. The dynamic filter media 112 may be pleated and stored in a fanfold arrangement such as paper is stored for tractor feed printers. The orientation of the fanfold stack may be parallel or perpendicular to the path of dynamic filter media as the dynamic filter media traverses the filter assembly 100.

Alternatively, the dynamic filter media 112 may be on an elongated spool or roller that is not connected to the turbine/gearbox/drive traction rollers beyond the connection provided by the pull of the dynamic filter media which pulls new material into the open portion of the filter assembly as used dynamic filter media 172 is pushed into the used filter media chamber 220. As the spool is being driven by the pull of the dynamic filter media 112 rather than the spool driving the movement of the dynamic filter media 112, the changing diameter of the spool combined with the layers of dynamic filter media 112 does not impact the rate of movement of the dynamic filter media 112.

As the dynamic filter media 112 is loaded into the clean filter media storage chamber 142 in an organized manner, the used filter media collection chamber 220 is apt to have a larger volume than the clean filter media storage chamber 142 in order to receive the same amount of dynamic filter media 112 as dynamic filter media 112 driven into the used filter media collection chamber 220 will have not be stored in as organized a manner.

Notice that the used filter media chamber 220 extends beyond the duct flange 420 to be downstream of the duct flange 420 which is in contrast to common filter design which traditionally did not cross the plane defined by the duct flange 420.

Visible downstream of the duct flange plane are portions of the airflow area flange 240 which includes the turbine side wall of the used filter media chamber 220. Also visible downstream of the duct flange plane are portions of the turbine blade perimeter flange 244 which substantially surrounds an area around the turbine blades. Notice that some of the static filter media 134 is located downstream of the duct flange 420.

Figure 7:
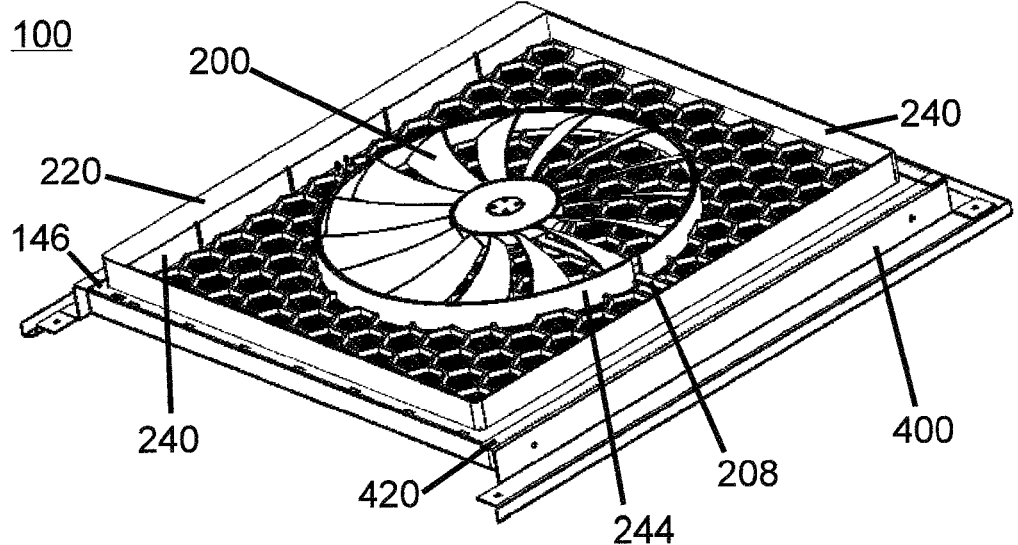
FIG. 7 shows a bottom perspective view of a filter assembly resting in a duct frame on duct flange via frame shoulder.

FIG. 7 shows a bottom perspective view of a filter assembly 100 resting in a duct frame 400 on duct flange 420 via frame shoulder 146. In order to facilitate viewing of components, one side of the duct frame 400 is missing.

Figure 8:
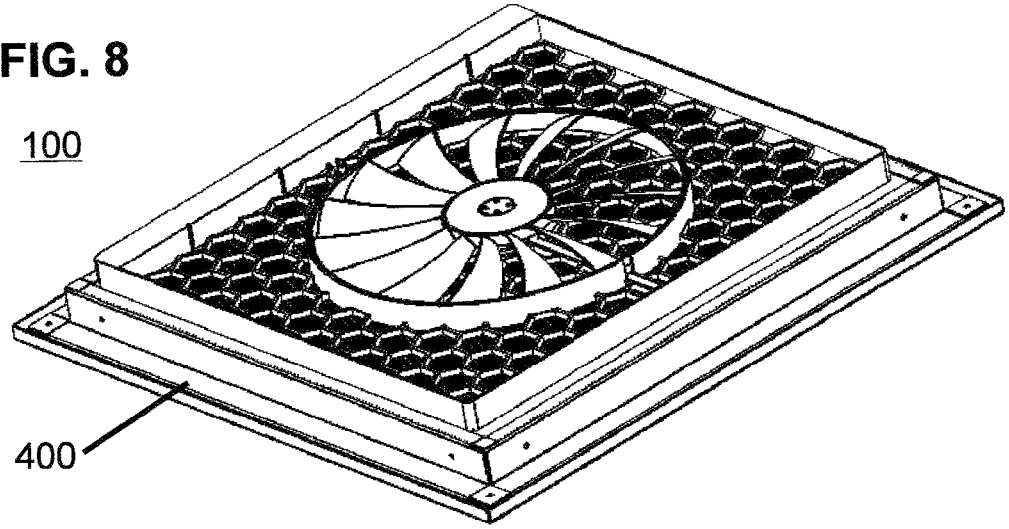
FIG. 8 shows the same view as FIG. 7 with the complete duct frame.

FIG. 8 shows the same view as FIG. 7 with the complete duct frame 400. Visible in FIG. 7 is turbine 200 (although some of the blades are difficult to see as they are aligned with the view angle). Substantially surrounding the area that drives the turbine blades is turbine blade perimeter flange 244 which helps protect the turbine 200 from damage during shipping and installation. The turbine blade perimeter flange 244 is not a complete perimeter as there is a gap to allow the drive belt 208 to extend from the gearbox 212 (FIG. 3) to the gear 320 (FIG. 9).

Airflow area flange 240 extends around the outer perimeter of the portion of the filter assembly 100 that has airflow. The turbine side wall of used filter media collection chamber 220 forms part of the airflow area flange 240.

Figure 9:
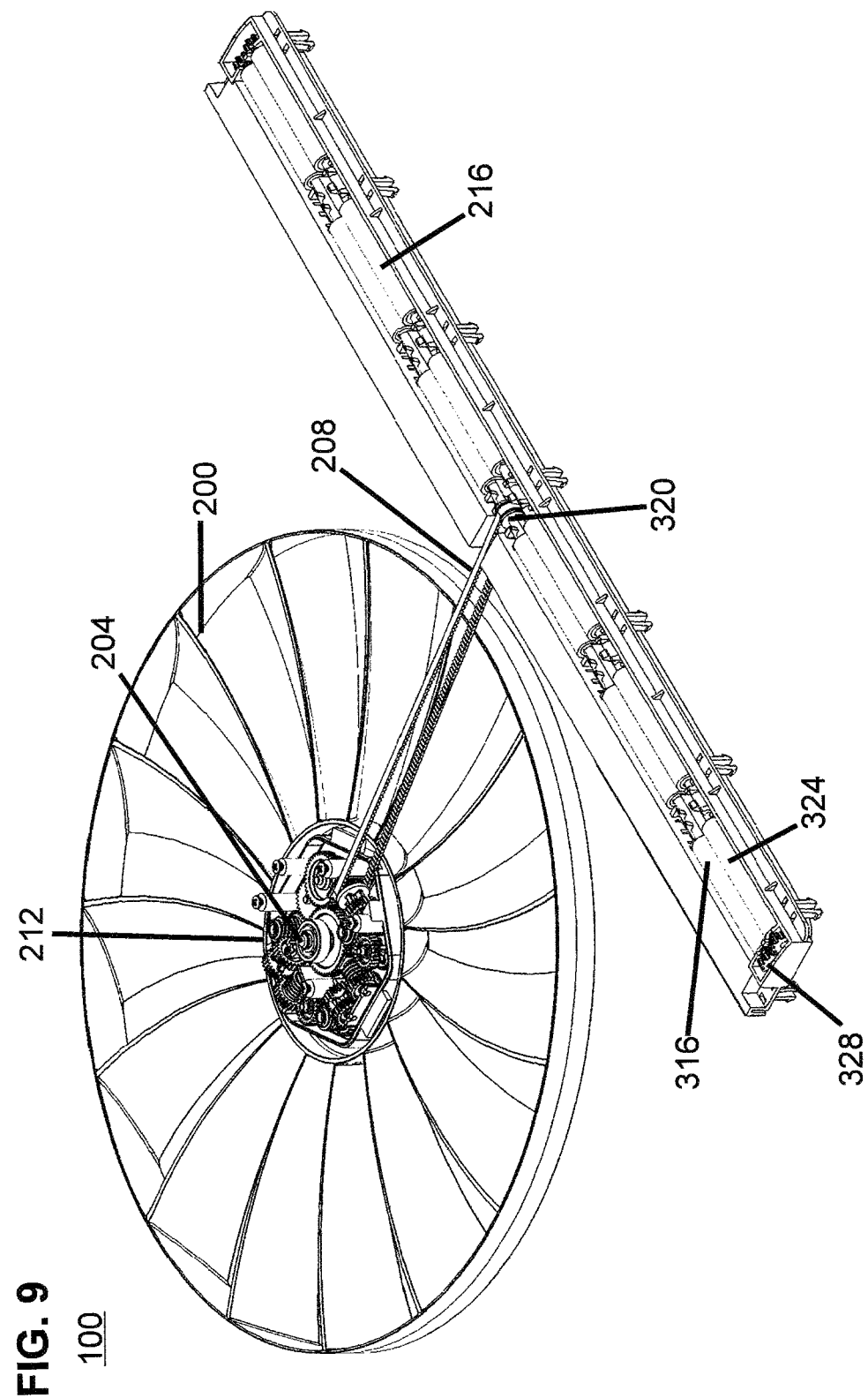
FIG. 9 shows the turbine connected to the gearbox (shown here with the cover removed) via turbine shaft.

FIG. 9 shows the turbine 200 connected to the gearbox 212 (shown here with the cover removed) via turbine shaft 204. The drive rollers 216 are moved as drive belt 208 moves the inner set of rollers 316 via gear 320. The movement of the inner set of rollers 316 causes an opposite movement of the outer set of rollers 324 via transfer gears 328.

Figure 10:
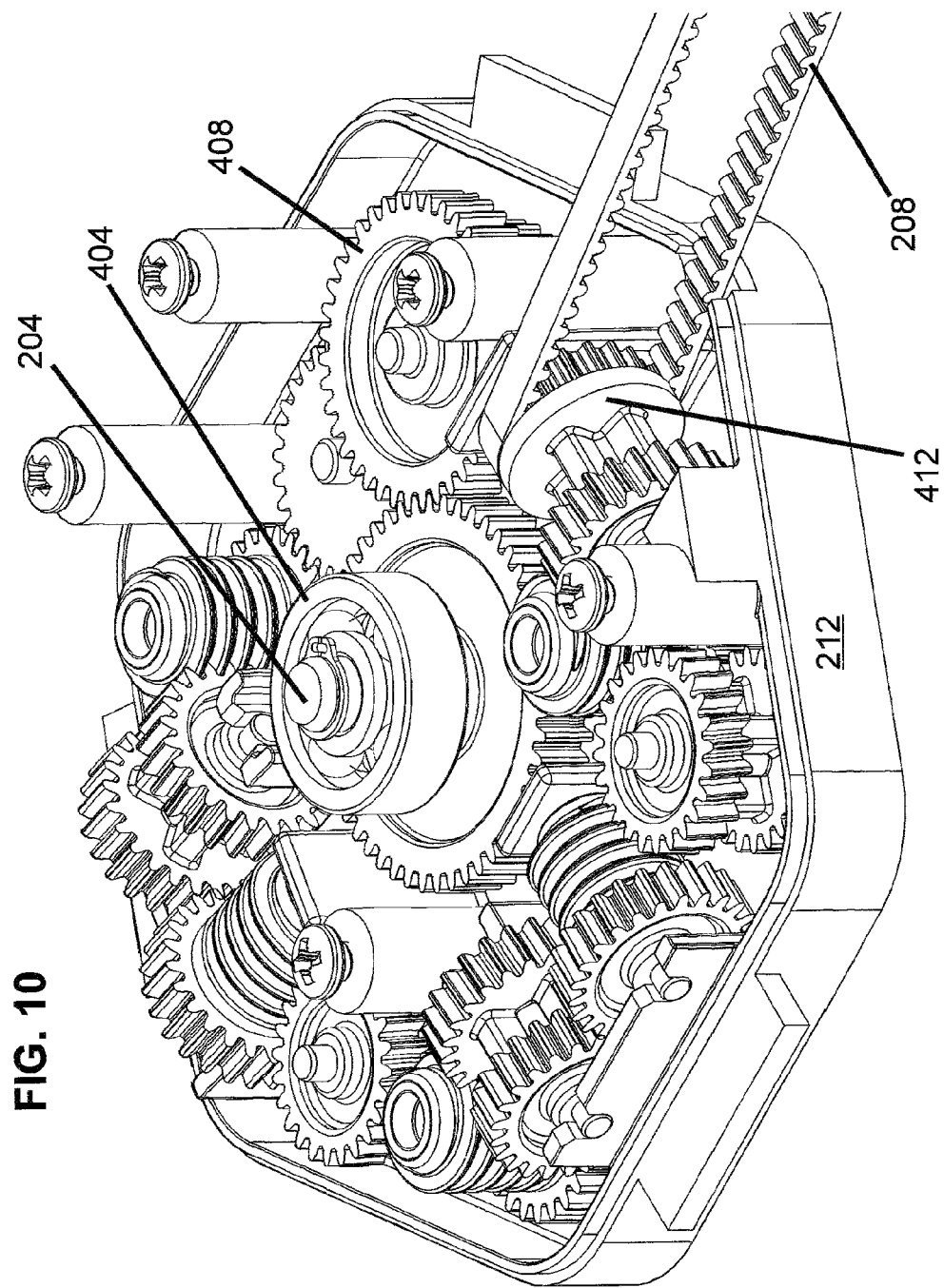
FIG. 10 shows a perspective view of the interior of gearbox.

FIG. 10 shows a perspective view of the interior of gearbox 212. While the precise arrangement of gears needed to get an adequate gear reduction ratio is beyond the scope of this disclosure and within the grasp of those of skill in the art, the general concept is that the rotational output of the turbine shaft 204 is transferred via fan shaft gear 404 to a first gear 408 in a series of gears ending with last gear 412 which moves the drive belt 208 (shown here truncated to enlarge the gearbox 212. Drive belt 208 rotates gear 320 (FIG. 9) to cause the drive rollers 216 to move. The choice and number of gears in the gearbox allows for a choice of gear ratio so that the turbine shaft 204 exposed to air flow in the intended range moves the dynamic filter media 112 at the intended rate. For example, for an air flow of 400 feet per minute, the rate of movement of the dynamic filter media may be in the range of 0.01 to 0.1 inches of movement per hour of operation of the HVAC system. For some applications, a gear ratio in the range of four million to one may be appropriate. For some applications a rate of movement for the dynamic filter of exposing dynamic filter material for no more than 28 days of continuous operation of the HVAC system at the rated air flow rate of 400 feet per minute. Thus, dynamic filter material would move from one side of the filter assembly to the other side in as few as 28 days if the HVAC blower ran continuously. One of skill in the art will recognize that certain combinations of rotating parts benefit from the use of bearings or bushings but these do not need to be discussed in detail here.

Changing the size of gear 320 (FIG. 9) will have an impact on the speed at which the dynamic filter media 112 moves across the filter assembly and into the used filter media chamber 220. Thus, a pair of nearly identical filter assemblies could be made with one having a smaller gear 320 to cause faster use of dynamic filter media and one with a larger gear 320 to have a slower consumption of dynamic filter media. Likewise, last gear 412 could be changed to alter the drive speed of the drive belt 208 for a given level of rotation of the turbine shaft 204. Thus, the two otherwise identical filter assemblies can be optimized for longer life or more intense need to remove large particles.

Advantages of Dynamic Operation

For purposes of conveying the concepts of this disclosure without the purpose of limiting the scope of the claims to specific numeric values presented, it may be useful to consider an overview of the consequences of dynamic operation for one particular use.

A prior art static filter for a 20 inch by 20 inch duct opening may have somewhere between 350 square inches of permeable surface area (as the impermeable frame drops this down from 400 square inches) to as much as 2000 square inches of surface area for a filter that is heavily pleated. For a 20 by 20 filter assembly 100, the permeable area may be approximately 16.5 inches by approximately 15 inches (as the distance between the clean filter media storage chamber 142 and the used filter media collection chamber 220 is slightly reduced). Thus by having dynamic filter media 112 in a sheet of 16.5 inches wide and 90 to 180 inches long allows the dynamic filter media 112 to change over 6 to 12 times during the operation of the filter frame assembly. This would be approximately 1500 to 3000 square inches of dynamic filter material. It is expected that should the filter assembly 100 be left in operation longer than recommended, that the trailing end of the extended sheet of dynamic filter media 112 would slowly travel across the filter assembly 100 and be deposited in the used filter media collection chamber to leave the filter assembly 100 to continue to operate but without a dynamic filter layer.

Even acknowledging that some of the dynamic media will be removed quickly as some of the dynamic media was already partway to the used filter media collection chamber 220 when the filter assembly 100 was placed in service and that the filter assembly 100 is apt to be replaced before all the dynamic filter media 112 traverses across the filter assembly 100, one can appreciate that the use of dynamic filter media 112 which removes large particles and provides new dynamic filter media 112 allows for improved filter performance.

To appreciate the advantages of the filter assembly 100 with dynamic filter media 112, it is important to review the normal life cycle of a static filter. As particles are captured in a standard static filter, the static filter becomes more efficient at capturing particles. Thus, a static filter that starts out capturing 80% of 1 micron particles may, after an ample use, be capturing more than 95% of such particles. While increasing the effectiveness at removing large particles is desirable, the downside is an increase in pressure drop across the now partially clogged static filter which reduces the air flow through the system and thus causes the system to run longer in order to provide the same amount of cooling. A standard filter can start up having a pressure drop of 0.2 inches of water column to 0.4 inches of water column (function of air speed and filter design) and end up with a pressure drop well above 1.0 inches of water column which negatively impacts the ability of the blower to move air through the system.

In contrast, the dynamic filter media 112 will remove those larger particles captured so larger particles will not build up, causing an ever increasing pressure drop. The initial pressure drop across the filter assembly 100 may be larger than a brand new static filter (as the filter assembly 100 may have a smaller permeable area for a given duct size and an added layer of filter material). The initial pressure drop across the filter assembly 100 will increase slowly for a period as the initially exposed dynamic filter material traps particles. However, the pressure drop across the filter assembly 100 with dynamic filter material will not continue to rise once the impact of clean dynamic filter material 112 replacing used dynamic filter material causes the pressure drop to level off One of skill in the art will recognize that exposure to unusually particle laden air for a short period may cause an upward drift in pressure drop, but the changeover of used dynamic filter material for unused dynamic filter material will continue to offset increases in pressure drop.

The average pressure drop across the filter assembly 100 over the period of intended use is expected to be less than the average of almost all standard filters even if they are changed per manufacturer's recommendations. However, since it has been reported that the average residential user changes their filters much less frequently than the manufacturer's recommendation, the differential in average pressure drop between a filter assembly 100 and a static filter may be dramatic.

Alternatives and Variations

Placement of the Filter Assembly.

While the examples set forth above have focused on placement of the filter assembly at an inlet to return air ducts to the HVAC system, a filter assembly using various teachings from this disclosure could be placed at any location where filters are used. For example, some systems of air handling equipment have one or more filters immediately upstream of the air handling unit. Filters used in this location are frequently slid into slots rather than placed over the inlet of a duct. For example, filter assemblies may be created that fit within a two inch deep slot. Other filter assemblies may be created for use in slots that are three inches deep, four inches deep, or some other nominal depth. When making a filter assembly for insertion into a slot, one of skill in the art will recognize the advantage of having the filter assembly frame sized for the intended filter slot with all components including the turbine 200 fitting within the framed depth of the filter assembly so that components downstream of the filter media are not damaged during the insertion into position for use. Thus, the turbine does not extend downstream of a downstream edge of the frame. The actual location of the filter assembly relative to other components in the air handling system is not relevant to the teachings of the present disclosure as the filter assemblies will provide filtration whenever air is moved across the filter assembly.

Uses Beyond an HVAC System.

One of skill in the art will recognize that with appropriate adjustments for the size of the filter, air flow rate, and speed at which dynamic filter material should be replaced to maintain acceptable pressure drops, that the teachings of the present disclosure may be used in contexts beyond an HVAC filter. For examples, gasoline and diesel engines have air filters that remove particles from the air stream used in combustion. Respirator systems, especially those used by personnel in dusty environments have air flow in one direction based upon the pulmonary intake and then the exhaled air travels a different path to exit the respirator. Some of these respirators have chemically active filters to remove specific materials from the air stream going to the user.

Constant Air Movement.

Although the use described in detail above anticipates periods of no air flow as the action of a HVAC it typically intermittent, nothing in the present disclosure limits the use of the filter assembly to intermittent flows. A filter assembly may be used with a continuous flow of air from after insertion to removal from service.

Layers of Filter Media.

The example set forth above uses one layer of dynamic filter media 112 and one layer of static filter media 134. One of skill in the art may create a filter assembly with other combinations such as first layer of dynamic filter media followed by two or more layers of static filters. One of skill in the art could create a filter assembly with a dynamic filter media but no static filter layer. This may be particularly appropriate if the flow path goes through several filter assemblies such that the first filter assembly uses dynamic filter media and a second independent filter assembly placed downstream has static filter assemblies that work on the flow stream after removal of a certain range of targeted larger particles by the filter assembly using dynamic filter media.

Treatments Applied to the Filter Media.

The static filter media or the dynamic filter media may be treated with various antimicrobial treatments known in the art. The static filter media or the dynamic filter media may be electro-statically charged to improve the tendency to capture particles. The static filter media or the dynamic filter media may contain carbon or analogous materials to remove certain contaminants from the air during the filtering process. The static filter media or the dynamic filter media may be treated with materials known in the art to slowly release a scent into the airstream that moves across the filter assembly. One of skill in the art will recognize that the process of moving scent releasing material across a constant or intermittent air stream could be used to form an air fresher that does not serve any intended purpose as a filtering device.

Alternatives to Drive Traction Rollers.

One of skill in the art will appreciate that the drive traction rollers 216 shown above are nip rollers. Other mechanisms may be used to convert input from the spinning turbine 200 adapted by a gearbox 212 to move dynamic filter media 112 into the used media storage chamber 220. The mechanism may use meshing drive gears that engage dynamic filter media trapped between the rotating gears to drive the dynamic filter media. Various mechanism used in web-fed printing processes may be used.

Aspect Ratio, Size, and Depth.

While the example illustrated above is for an air duct frame of a particular size, one of skill in the art will recognize that air returns come in a number of different sizes and many have rectangular rather than square openings. The teachings of the present disclosure may be adapted to create filter assemblies that are rectangular or other shapes. Likewise the size of the filter assembly may be larger or smaller than shown here (size may be inferred from the dimensions relative to the depth of the duct flange).

Various components identified above may be joined together with snap-fits. One of skill in the art will recognize that other attachment choices are possible and are a matter of choice based on manufacturing costs and other factors. Threaded engagement through use of screws is one option. Use of adhesives for some or all of the connection is another option.

Location of the Gearbox.

While the example set forth above placed the gearbox 212 in the region surrounding the turbine shaft 204 and then use a drive belt 208 to move the energy to the side of the filter assembly with the used filter media collection chamber 220, one of skill in the art could move the rotational energy from the turbine shaft 204 via a drive belt 208 to one or more sides of the frame and then use one or more gearboxes to convert the rotation to low speed/high torque to drive the used dynamic filter media. Choices include placement of the gearbox in the side of the filter assembly with the used filter media collection chamber 220 or to either or both of the sides between the clean filter media storage chamber 142 and the used filter media collection chamber 220 provided that the gear train provides output on the used filter media collection chamber end of the side wall.

Choice of Drive Belt.

While a toothed drive belt has been shown above, those of skill in the art recognize that many other belts, including those without teeth, drive chains, drive shafts, or other devices may be used to convey rotational energy from a source to a remote location. These various options all fit within the category of means for conveying rotation. The particular choice is not central to the teachings of this disclosure.

Alternatives to the Turbine.

The present disclosure shows a turbine 200 that is suitable for use with a given combination of air flow velocities and gearbox to provide adequate movement of the dynamic filter media across the filter assembly. The teachings of the present disclosure are not limited to this particular turbine design. Many other turbine devices have been designed for use in translating wind energy into rotational energy. Those of ordinary skill in the art may make substitutions to use other turbine types. Flexibility in turbine choice is promoted by the teaching of a filter assembly that extends downstream beyond the duct flange plane so that the depth of the filter assembly is not limited by the depth of the duct opening to duct flange depth.

Desirable qualities for a turbine for use in a filter assembly include the generating maximum torque for a given depth and diameter of the turbine assembly. While a particular filter assembly may be designed for a particular target range of air flow speeds, the filter assembly should be able to operate at a fraction of the target speed. For example, it would be desirable for a filter assembly designed for an average residential air speed of 350 to 450 feet/minute to generate enough torque to continue to move dynamic filter media (albeit at a slower rate) when the filter assembly is exposed to air flow at 150 feet/minute.

One of skill in the art could employ a turbine that has a central shaft that is perpendicular to the flow of air rather than parallel to the flow of air as show above. Energy from the rotating shaft would need to be moved either directly or indirectly to a gear box for conversion then transmission to the drive mechanism for the used dynamic filter media.

Gases Other than Air.

Nothing in the present disclosure requires that the gas that passes through the filter assembly be ambient air. One could use other gases such as to filter particles from industrial gases so as to protect equipment downstream of the filter assembly from materials that do not belong in the industrial gas. A filter assembly could be used on anesthetics or other gases used in a medical contexts. The filter assembly could be used to remove particulate from combustion gases such as the flue gas of a boiler.

Liquids.

One of skill in the art could adjust the teachings of the present disclosure to remove material from liquids.

General Comments

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A filter assembly for removing particles from air flow across the filter assembly, the filter assembly comprising:

a frame around a perimeter of the filter assembly;

a quantity of dynamic filter media for removing particles from air flowing from an upstream side of the filter assembly to a downstream side of the filter assembly;

a clean filter media storage chamber on a first side of the filter assembly;

a used filter media collection chamber within the frame on a second side of the filter assembly, opposite from the first side;

a turbine which spins from air flow traveling from the upstream side of the filter assembly to the downstream side of the filter assembly;

a gearbox receiving torque input from the turbine, the gearbox drives the dynamic filter media across the upstream side of the filter assembly and deposits dynamic filter media after use into the used filter media collection chamber; and wherein a speed that dynamic media is moved into the used filter media collection chamber is dependent on a rate of air flow and largely independent of a length of time that the filter assembly has been in service.

2. The filter assembly of claim 1 wherein a rate of movement of the dynamic filter media tested using particle free air is proportional to the rate of air flow from the upstream side to the downstream side across the filter assembly and independent of the length of time that the filter assembly has been in service.

3. The filter assembly of claim 1 wherein the turbine does not extend downstream of a downstream edge of the frame whereby the filter assembly may be inserted into a filter slot in air handling equipment without damage to the turbine.

4. The filter assembly of claim 1 wherein the dynamic filter media is pleated and stored within the clean filter media storage chamber in a dispensable form.

5. The filter assembly of claim 1 wherein the dynamic filter media is pleated and stored within the clean filter media storage chamber in a fanfold stack.

6. The filter assembly of claim 1 wherein the dynamic filter media is loaded on a spool and stored within the clean filter media storage chamber in a dispensable form.

7. The filter assembly of claim 1 wherein
the torque input from a turbine shaft drives the gears in the gearbox which drives a set of traction rollers located near the used filter media collection chamber, the set of traction rollers drive the dynamic filter media across the upstream side of the filter assembly and pushes dynamic filter media into the used filter media collection chamber.

8. The filter assembly of claim 7 wherein the turbine shaft directly drives the gears in the gearbox and an output of the gearbox is transmitted from near the turbine shaft to a gear associated with the set of traction rollers.

9. The filter assembly of claim 7 wherein the turbine shaft is separated from the gears in the gearbox by a transmission means and an output of the gearbox is directly connected to a gear associated with the set of traction rollers.

10. The filter assembly of claim 1 wherein the gearbox is located around a rotational centerline of the turbine and transmits torque to a set of traction rollers through use of a drive belt.

11. The filter assembly of claim 1 further comprising a static filter positioned downstream from the dynamic filter media located between the first side of the filter assembly and the second side of the filter assembly so that air moving from the upstream side to the downstream side of the filter assembly moves through the dynamic filter media to remove some particles before additional filtration by the static filter.

12. The filter assembly of claim 11 wherein the static filter is located between the clean filter media storage chamber near the frame on the first side of the filter assembly; and the used filter media collection chamber within near the frame on the second side of the filter assembly, opposite from the first side.

13. A filter assembly for removing particles from an air flow, the filter assembly comprising:
a quantity of dynamic filter media for removing particles from air flowing from an upstream side of the filter assembly to a downstream side of the filter assembly;
a frame around a perimeter of the filter assembly, the frame having a shoulder facing downstream between an upstream end of the frame and a downstream end of the frame so that the shoulder may engage a duct flange to rest against an upstream face of the duct flange;
a clean filter media storage chamber on a first side of the filter assembly;
a used filter media collection chamber within the frame on a second side of the filter assembly, opposite from the first side; the used filter media collection chamber extending downstream beyond the duct flange;
a turbine with a turbine shaft which spins from air flow traveling from the upstream side of the filter assembly to the downstream side of the filter assembly, the turbine shaft used to drive dynamic filter media into the used filter media collection chamber and pull unused dynamic filter media from the clean filter media storage chamber and;
wherein a speed that dynamic media is moved into the used filter media collection chamber is dependent on a rate of air flow and largely independent of a length of time that the filter assembly has been in service.

14. The filter assembly of claim 13 further comprising:
a gearbox receiving torque input from the turbine shaft and converting the torque input to a low speed/high torque output for use to drive a set of drive traction rollers which drives the dynamic filter media across the upstream side of the filter assembly and deposits the used dynamic filter media into the used filter media collection chamber.

15. The filter assembly of claim 14 further comprising a means for conveying rotation connected to one end of the gearbox.

16. The filter assembly of claim 14 wherein the turbine shaft drives one end of the gearbox which drives a means for conveying rotation which drives the dynamic filter media into the used filter media chamber.

17. The filter assembly of claim 14 wherein the turbine shaft drives one end of a means for conveying rotation which drives one end of the gearbox which drives the dynamic filter media into the used filter media chamber.

18. A filter assembly for removing particles from an air flow, the filter assembly comprising:
filter media including static filter media and dynamic filter media;
a quantity of dynamic filter media for removing particles from air flowing from an upstream side of the filter assembly to a downstream side of the filter assembly as a portion of the dynamic filter media exposed to air flow as the dynamic filter media moves from one side of the filter assembly to an opposite side of the filter assembly;
a frame around a perimeter of the filter assembly, the frame having a shoulder facing downstream between an upstream end of the frame and a downstream end of the frame so that the shoulder may engage a duct flange to rest against an upstream face of the duct flange;
a clean filter media storage chamber on a first side of the filter assembly;
a used filter media collection chamber within the frame on a second side of the filter assembly, opposite from the first side;
static filter media located downstream of the portion of the dynamic filter media exposed to air flow; and
a turbine with a turbine shaft which spins from air flow traveling from the upstream side of the filter assembly to the downstream side of the filter assembly, the turbine shaft used to drive dynamic filter media into the used filter media collection chamber and pull unused dynamic filter media from the clean filter media storage chamber;
wherein a speed that dynamic media is moved into the used filter media collection chamber is dependent on a rate of air flow and largely independent of a length of time that the filter assembly has been in service; and
wherein at least some filter media is located downstream of the duct flange during use of the filter assembly.

19. A method for removing particles from a moving stream of air moving in an air duct when an air handling system is operating, the method comprising:
placing a filter assembly in the air duct such that when the air handling system uses at least one fan to cause movement of air through the duct, at least a portion of that air travels through the filter assembly from an upstream side of the filter assembly to a downstream side of the filter assembly;
operating the air handling system so that the air handing system at least intermittently uses the at least one fan to cause movement of the air through the filter assembly;
using a turbine with a turbine shaft, the turbine located on the downstream side of the filter assembly to convert a portion of kinetic energy of the moving air to rotational energy; and
using the rotational energy of the turbine shaft to cause dynamic filter media to move into a used filter media collection chamber while pulling unused dynamic filter media from a clean filter media chamber on an opposite side of the filter assembly from the used filter media collection chamber; and
wherein a speed that dynamic media is moved into the used filter media collection chamber is dependent on a rate of air flow and largely independent of a length of time that the filter assembly has been in service.

20. The method of claim 19 wherein the filter assembly is slid laterally into a filter slot in the air duct as the turbine does not extend downstream of a downstream edge of a filter assembly frame whereby the filter assembly may be inserted into the filter slot without damage to the turbine.

21. The method of claim 19 wherein the rotational energy of the turbine shaft to cause dynamic filter media to move into the used filter media chamber while pulling unused dynamic filter media from the clean filter media chamber on the opposite side of the filter assembly from the used filter media chamber is performed using drive traction rollers.

\* \* \* \* \*